US006644798B2

(12) United States Patent
Katsuragi et al.

(10) Patent No.: US 6,644,798 B2
(45) Date of Patent: Nov. 11, 2003

(54) METHOD OF REDUCING KOGATION OF HEATER OF INK-JET RECORDING HEAD, INK-JET RECORDING METHOD, INK-JET RECORDING APPARATUS, RECORDING UNIT AND METHOD FOR PROLONGING SERVICE LIFE OF RECORDING HEAD

(75) Inventors: Ryuji Katsuragi, Tokyo (JP); Makoto Shioya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/779,647

(22) Filed: Feb. 9, 2001

(65) Prior Publication Data
US 2001/0045975 A1 Nov. 29, 2001

(30) Foreign Application Priority Data

Feb. 10, 2000 (JP) ........................ 2000-038237
Feb. 10, 2000 (JP) ........................ 2000-038238

(51) Int. Cl.$^7$ .......................... G01D 11/00; C09D 11/00
(52) U.S. Cl. .................. 347/100; 101/31.58; 101/31.86
(58) Field of Search ...................... 347/100; 106/31.27, 106/31.58, 31.6, 31.86, 31.13

(56) References Cited

U.S. PATENT DOCUMENTS

| 5,062,892 A | 11/1991 | Halko ........................... 106/22 |
| 5,380,358 A | 1/1995 | Aoki et al. .................... 106/20 |
| 5,431,720 A | * 7/1995 | Nagai et al. .............. 106/31.43 |
| 5,679,143 A | 10/1997 | Looman .................... 106/20 R |
| 5,785,743 A | * 7/1998 | Adamic et al. .......... 106/31.27 |
| 5,792,249 A | 8/1998 | Shirota |
| 5,825,380 A | 10/1998 | Ichizawa et al. .............. 347/28 |

FOREIGN PATENT DOCUMENTS

| EP | 0 425 150 | 2/1991 |
| EP | 0 716 134 | 6/1996 |
| JP | 54-51837 | 4/1979 |
| JP | 3-160070 | 7/1991 |
| JP | 5-186704 | 7/1993 |
| JP | 6-93218 | 4/1994 |
| JP | 6-200203 | 7/1994 |
| JP | 8-3498 | 1/1996 |
| JP | 9-39260 | 2/1997 |

\* cited by examiner

*Primary Examiner*—Judy Nguyen
*Assistant Examiner*—Michael S. Brooke

(57) ABSTRACT

A method of reducing the kogation of the surface of the heater of a recording head for applying thermal energy to the ink in the recording head in order to discharge the ink from the recording head can effectively reduce the kogation to make it possible to print high quality images and prolong the service life of the recording head. With the method of reducing the kogation of the surface of the heater of the ink-jet recording head of an ink-jet printer, the ink-jet recording head is provided with a heater for applying thermal energy to ink in order to discharge ink from an orifice and the heater has a top surface protecting layer containing a metal and/or a metal oxide, while the ink is adapted to ink-jet recording and contains (a) a coloring material, (b) a liquid medium and (c) diglycollic acid or iminodiacetic acid or salts thereof.

10 Claims, 3 Drawing Sheets

METHOD OF REDUCING KOGATION OF HEATER OF INK-JET RECORDING HEAD, INK-JET RECORDING METHOD, INK-JET RECORDING APPARATUS, RECORDING UNIT AND METHOD FOR PROLONGING SERVICE LIFE OF RECORDING HEAD

BACKGROUND OF THE INVENTION

1. Field of the Invention

This invention relates to ink adapted to reduce the kogation, a scorched condition, of the surface of a heater for applying thermal energy to ink, to a method of preventing the kogation of the surface of a heater, to an ink-jet recording method, to an ink-jet recording apparatus, to a recording unit and also to a method of prolonging the service life of an ink-jet recording head.

2. Related Background Art

Various printing techniques using an ink-jet method have been proposed to date. Of the known ink-jet methods, the one described in Japanese Patent Application Laid-Open No. 54-51837 and adapted to discharge ink in the form of ink droplets under the effect of the thermal energy applied to the ink to be ejected from a recording head (so-called 'bubble-jet' method) is highly advantageous because it can produce high quality images on ordinary plain paper not having any specific coat layer at high speed and at low cost due to the fact that the high density multi-nozzle of the recording head has a very simple configuration. With the above identified method, the liquid on the heater of the recording head generates a bubble as the heater is heated rapidly and the volume of the bubble is rapidly increased to exert a power to the liquid so as to discharge ink droplets from the nozzle at the front end of the recording head. The discharged ink droplets are then made to adhere to a recording medium for printing.

However, the above identified method is accompanied by a drawback that, since the heater of the recording head is heated each time when ink is discharged from the recording head, a decomposition product of ink (so-called 'koga') is deposited on the surface of the heater particularly when a large volume of ink is used with the recording head for printing. As koga is deposited, thermal energy is not effectively transmitted from the heater to the ink to be discharged from the recording head so that there can arise a problem that the rate at which ink droplets are discharged is reduced from the initial level in terms of both volume and velocity. Then, the recording head may have to be replaced particularly in the case of printing a large number of high quality images. Such a situation can end up with a rise of the printing cost to the user of the printing head.

Therefore, in the case of bubble jet recording method, it has been and still is a vital technical challenge to the industry to reduce the kogation of the surface of the heater of a recording head of the type under consideration that can give rise to the above identified problem and to prolong the service life of the recording head. For instance, Japanese Patent Application Laid-Open No. 3-160070 proposes ink containing oxo anions of an appropriate compound selected from phosphates, polyphosphates, esters of phosphoric acid (phosphates), arsenates, molybdates, sulfates, sulfites, oxalates and so on.

SUMMARY OF THE INVENTION

Under the above identified technological circumstances, it is therefore an object of the present invention to provide ink that can reduce the kogation of the surface of the heater of a recording head of the type under consideration that is produced when thermal energy is applied to the ink contained in the recording head in order to discharge the ink from the recording head.

Another object of the present invention is to provide a method of reducing the kogation of the surface of the heater of a recording head of the type under consideration that can be produced when thermal energy is applied to the ink contained in the recording head in order to discharge the ink from the recording head.

Still another object of the present invention is to provide an ink-jet recording apparatus that can print higher quality images than ever and prolong the service life of the recording head.

Still another object of the present invention is to provide a recording unit that can print high quality images with a prolonged service life.

A further object of the present invention is to provide a method for prolonging the service life of a recording head that can print high quality images at lower cost than ever.

According to the invention, the above objects are achieved by providing ink containing (a) a coloring material, (b) a liquid medium and (c) at least one compound selected from the group consisting of diglycollic acid and diglycollates.

In another aspect of the invention, there is provided a method of reducing the kogation of the surface of the heater of the recording head of an ink-jet printer, the heater being provided to apply thermal energy to the ink contained in the recording head in order to discharge the ink from an orifice, the heater having a top surface protecting layer containing a metal and/or a metal oxide, wherein the ink is ink for ink-jet printing and contains (a) a coloring material, (b) a liquid medium and (c) at least one compound selected from the group consisting of diglycollic acid and diglycollates.

According to the invention, it is now possible to effectively reduce the kogation of the top surface protecting layer of the heater. While it is not clear why ink according to the invention provides such an effect, the inventors of the present invention presume that the diglycollic acid in ink acts on the metal and/or the metal oxide of the top surface protecting layer of the heater and prevents koga from adhering to the surface or promotes decomposition of koga and exfoliation thereof from the surface of the heater.

As a result of an extensive study conducted by the inventors of the present invention, it has been found that the effect of the top surface protecting layer is very remarkable when tantalum and tantalum oxide are used respectively for the metal and the metal oxide. If the amount of energy applied to the heater is $E_{op}$ and the minimal amount of energy that has to be applied to the heater in order to make the recording head discharge ink therefrom is $E_{th}$, it has been found that the koga prevention effect is maximized and the ink discharge durability of the recording head is remarkably improved when the amount of energy applied to the heater is so selected as to make the ratio of $E_{op}/E_{th}$ satisfies the relationship defined below.

$$1.10 \leq E_{op}/E_{th} \leq 1.80$$

In still another aspect of the invention, there is also provided an ink-jet recording method comprising a step of discharging ink from an orifice under the effect of thermal energy, wherein the ink to be used by the method is adapted to ink-jet recording and contains (a) a coloring material, (b)

a liquid medium and (c) at least one compound selected from the group consisting of diglycollic acid and diglycollates.

In still another aspect of the invention, there is also provided an ink-jet recording apparatus comprising an ink-containing section for containing ink, an ink-jet recording head having a heater for applying thermal energy to the ink led from the ink-containing section and held in the ink path of the head and a means for applying a pulse-shaped electric signal to the heater according to the recording information given to it, the heater having a top surface protecting layer containing a metal and/or a metal oxide, wherein said ink is adapted to ink-jet recording and contains (a) a coloring material, (b) a liquid medium and (c) at least one compound selected from the group consisting of diglycollic acid and diglycollates.

In still another aspect of the invention, there is also provided a recording unit comprising an ink-containing section for containing ink and an ink-jet recording head adapted to discharge ink from an orifice under the effect of thermal energy, the ink-jet recording head being provided with a heater having a top surface protecting layer containing a metal and/or a metal oxide, wherein the ink is adapted to ink-jet recording and contains (a) a coloring material, (b) a liquid medium and (c) at least one compound selected from the group consisting of diglycollic acid and diglycollates.

In still another aspect of the invention, there is provided a method of prolonging the service life of a recording head to be used for an ink-jet recording method comprising a step of discharging ink from an orifice by applying thermal energy to ink, the recording head being provided with a heater for applying thermal energy to ink, the heater having a top surface protecting layer containing a metal and/or a metal oxide, wherein the ink is adapted to ink-jet recording and contains (a) a coloring material, (b) a liquid medium and (c) at least one compound selected from the group consisting of diglycollic acid and diglycollates.

In still another aspect of the invention, there is provided a method of reducing the kogation of the surface of the heater of the ink-jet recording head of an ink-jet printer, the ink-jet recording head being provided with a heater for applying thermal energy to ink in order to discharge ink from an orifice, the heater having a top surface protecting layer containing a metal and/or a metal oxide, wherein the ink is adapted to ink-jet recording and contains (a) a coloring material, (b) a liquid medium and (c) at least one compound selected from the group consisting of iminodiacetic acid and iminodiacetates.

Thus, according to the invention, it is now possible to effectively reduce the kogation of the top surface protecting layer of the heater. While it is not clear why ink according to the invention provides such an effect, the inventors of the present invention presume that the iminodiacetic acid or iminodiacetates in ink acts on the metal and/or the metal oxide of the top surface protecting layer of the heater and prevents koga from adhering to the surface or promotes decomposition of koga and exfoliation thereof from the surface of the heater.

As a result of an extensive study conducted by the inventors of the present invention, it has been found that the effect of the top surface printing layer is very remarkable when tantalum and tantalum oxide are used respectively for the metal and the metal oxide. If the amount of energy applied to the heater is $E_{op}$ and the minimal amount of energy that has to be applied to the heater in order to make the recording head discharge ink therefrom is $E_{th}$, it has been found that the koga prevention effect is maximized and the ink discharge durability of the recording head is remarkably improved when the amount of energy applied to the heater is so selected as to make the ratio of $E_{op}/E_{th}$ satisfies the relationship defined below.

$$1.10 \leq E_{op}/E_{th} \leq 1.70$$

In still another aspect of the invention, there is also provided an ink-jet recording apparatus comprising an ink-containing section for containing ink, an ink-jet recording head having a heater for applying thermal energy to the ink led from the ink-containing section and held in the ink path of the head and a means for applying a pulse-shaped electric signal to the heater according to the recording information given to it, the heater having a top surface protecting layer containing a metal and/or a metal oxide, wherein the ink is adapted to ink-jet recording and contains (a) a coloring material, (b) a liquid medium and (c) at least one compound selected from the group consisting of iminodiacetic acid and iminodiacetates.

In still another aspect of the invention, there is also provided a recording unit comprising an ink-containing section for containing ink and an ink-jet recording head adapted to discharge ink from an orifice under the effect of thermal energy, the ink-jet recording head being provided with a heater having a top surface protecting layer containing a metal and/or a metal oxide, wherein the ink is adapted to ink-jet recording and contains (a) a coloring material, (b) a liquid medium and (c) at least one compound selected from the group consisting of iminodiacetic acid and iminodiacetates.

In a further aspect of the invention, there is provided a method of prolonging the service life of a recording head to be used for an ink-jet recording method comprising a step of discharging ink from an orifice by applying thermal energy to ink, the recording head being provided with a heater for applying thermal energy to ink, the heater having a top surface protecting layer containing a metal and/or a metal oxide, wherein the ink is adapted to ink-jet recording and contains (a) a coloring material, (b) a liquid medium and (c) at least one compound selected from the group consisting of iminodiacetic acid and iminodiacetates.

DESCRIPTION OF THE PREFERRED EMBODIMENTS

Figure 1:
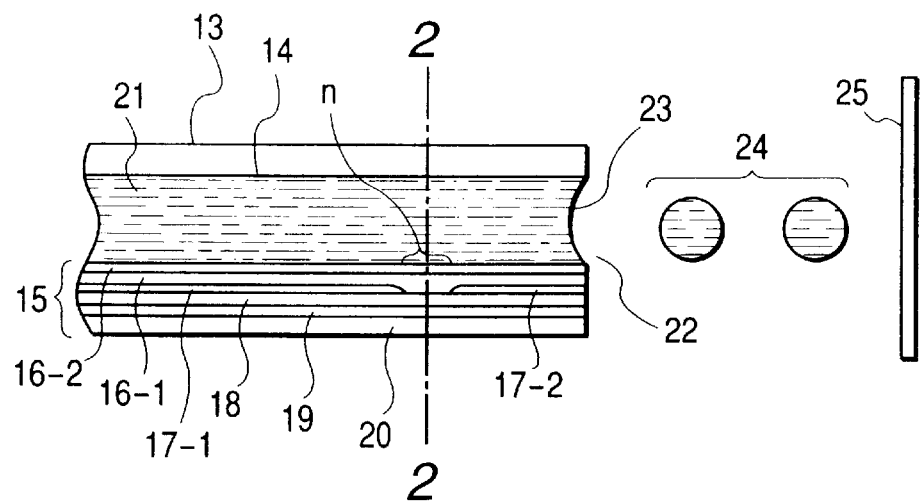
FIG. 1 is a schematic longitudinal cross sectional view of the recording head of an embodiment of ink-jet recording apparatus according to the invention.

Now, the present invention will be described in greater detail by referring to the accompanying drawings that illustrate preferred embodiments of the invention. Firstly, the materials for ink according to the invention will be discussed.

First Mode of Carrying out the Invention

A characteristic feature of the first mode of carrying out the invention is the use of ink containing (a) a coloring material, (b) a liquid medium, and (c) diglycollic acid or diglycollates.

Diglycollic Acid and Diglycollates

Diglycollic acid and diglycollates that may be contained in the ink to be used for the purpose of the present invention will be discussed below.

As a result of intensive efforts for finding a method of effectively reducing the kogation of the surface of the heater of an ink-jet recording head for applying thermal energy to ink in order to discharge the ink as ink droplets, the inventors of the present invention came to find that the occurrence of kogation can be remarkably reduced by using ink containing diglycollic acid expressed by the chemical formula below.

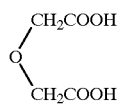

Furthermore, while the pH value of ink to be used with an ink-jet recording method is regulated to an appropriate level, it is preferably regulated by means of basic compounds if the ink contains diglycollic acid. Basic compounds that can be used to regulate the pH value of ink for the purpose of the invention include lithium hydroxide, sodium hydroxide, potassium hydroxide, ammonium hydroxide and organic amines (e.g., triethanolamine, diethanolamine, monoethanolamine, triisopropanolamine). Thus, the above diglycollic acid used in ink of the present invention may be present in a salt form including, for example, lithium diglycollate, sodium diglycollate, potassium diglycollate and ammonium diglycollate. The total content of diglycollic acid and diglycollates in ink is preferably between 0.005 and 20% by weight, more preferably between 0.05 and 12% by weight, relative to the total weight of ink. As long as the total content of diglycollic acid and diglycollates is found within the above defined range, the intended effect of reducing the kogation of the surface of the heater of the recording head is reliably produced and the nozzle of the head is prevented from clogging.

Coloring Material

Now, the coloring material that is contained in ink to be used for the purpose of the present invention along with diglycollic acid will be described below. The coloring material is preferably selected from dyes and/or pigments.

Dyes

Almost any dyes including direct dyes, acid dyes, basic dyes and disperse dyes may be used for the purpose of the invention. Specific examples nonlimitatively include:

C. I. Direct Black 4, 9, 11, 17, 19, 22, 32, 80, 151, 154, 168, 171, 194, 195;
C. I. Direct Blue 1, 2, 6, 8, 22, 34, 70, 71, 76, 78, 86, 142, 199, 200, 201, 202, 203, 207, 218, 236, 287;
C. I. Direct Red 1, 2, 4, 8, 9, 11, 13, 15, 20, 28, 31, 33, 37, 39, 51, 59, 62, 63, 73, 75, 80, 81, 83, 87, 90, 94, 95, 99, 101, 110, 189, 225, 227;
C. I. Direct Yellow 1, 2, 4, 8, 11, 12, 26, 27, 28, 33, 34, 41, 44, 48, 86, 87, 88, 132, 135, 142, 144;
C. I. Food Black 1, 2;
C. I. Acid Black 1, 2, 7, 16, 24, 26, 28, 31, 48, 52, 63, 107, 112, 118, 119, 121, 172, 194, 208;
C. I. Acid Blue 1, 7, 9, 15, 22, 23, 27, 29, 40, 43, 55, 59, 62, 78, 80, 81, 90, 102, 104, 111, 185, 254;
C. I. Acid Red 1, 4, 8, 13, 14, 15, 18, 21, 26, 35, 37, 52, 249, 257, 289;
C. I. Acid Yellow 1, 3, 4, 7, 11, 12, 13, 14, 19, 23, 25, 34, 38, 41, 42, 44, 53, 55, 61, 71, 76, 79;
C. I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, 46;
C. I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, 64, 180;
C. I. Reactive Yellow 1, 2, 3, 4, 6, 7, 11, 12, 13, 14, 15, 16, 17, 18, 22, 23, 24, 25, 26, 27, 37, 42;
C. I. Reactive Black 1, 3, 4, 5, 6, 8, 9, 10, 12, 13, 14, 18;
Projet Fast Cyan 2 (available from Zeneca),
Projet Fast Magenta 2 (available from Zeneca),
Projet Fast Yellow 2 (available from Zeneca), and
Projet Fast Black 2 (available from Zeneca).

Pigments

Almost any pigments including inorganic pigments and organic pigments may be used for the purpose of the invention. Specific examples nonlimitatively include: carbon black;
C. I. Pigment Yellow 1, 2, 3, 12, 13, 14, 16, 17, 73, 74, 75, 83, 93, 95, 97, 98, 114, 128, 129, 151, 154, 195;
C. I. Pigment Red 5, 7, 12, 48(Ca), 48(Mn), 57(Ca), 57:1, 57(Sr), 112, 122, 123, 168, 184, 202,
C. I. Pigment Blue 1, 2, 3, 15:3, 15:34, 16, 22, 60,
C. I. Vat Blue 4, and 6.

Dispersants

When any of the above listed pigments is used as coloring material of ink, a dispersant is preferably added in order to disperse such pigments stably in the ink. Dispersants that can be used for the purpose of the invention include polymer dispersants and surfactant type dispersants. Specific examples of polymer dispersants include polyacrylates (salts of polyacrylic acid), salts of styrene—acrylic acid copolymer, salts of styrene—methacrylic acid copolymer, salts of styrene—acrylic acid—acrylic ester copolymer, salts of styrene—maleic acid copolymer, salts of acrylic ester—maleic acid copolymer, salts of styrene—methacrylsulfonic acid copolymer, salts of vinylnaphthalene—maleic acid copolymer, salts of α-naphthalenesulfonic acid—formalin condensate, polyvinyl pyrrolidone, polyethylene glycol and polyvinyl alcohol, of which those having a weight-average molecular weight between 1,000 and 30,000 and an acid value between 100 and 430 are preferably used.

Specific examples of surfactant type dispersants include laurylbenzenesulfonates, laurylsulfonates, laurylbenzenecarboxylates, laurylnaphthalenesulfonates, aliphatic amine salts and polyethylene oxide condensates. Any of the above listed dispersants may advantageously be used for the purpose of the invention. The ratio by weight of the pigment to the dispersant in ink is preferably between 10:5 and 10:0.5.

Self-dispersion Type Carbon Black

For the purpose of the present invention, a carbon black pigment having a self-dispersion effect obtained by introducing water-soluble radicals onto the surface of carbon black particles as disclosed in Japanese Patent Applications Laid-Open Nos. 5-186704 and 8-3498 can be used. It may not necessarily need to use a dispersant if ink contains such a carbon black pigment having a self-dispersion effect.

For the purpose of the invention, ink may contain one or more than one of the above listed dyes and pigments. While the concentration of the dye or the pigment contained in ink is not subjected to particular limitations, it is normally between 0.1 and 20% by weight relative to the total weight of ink.

Liquid Medium

Now, the liquid medium contained in ink to be used for the purpose of the invention will be discussed below. For the purpose of the invention, a mixed medium of water with a water-soluble organic solvent is preferably used as liquid medium of ink.

Water to be used for the purpose of the invention is preferably not ordinary water that contains various ions but deionized water. The content of water in ink is preferably between 35 and 96% by weight relative to the total weight of ink. The water-soluble organic solvent to be used with water may be selected from those listed below depending on the application of ink. A water-soluble organic solvent is used to achieve a number of objectives including regulating the viscosity of ink to a desired level for use, lowering the ink drying rate, raising the solubility of the coloring material and preventing the nozzle of the recording head from clogging.

Specific examples of water-soluble organic solvents that can be used for the purpose of the invention include alkyl alcohols having 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones and ketoalcohols such as acetone and diacetone alcohol; ethers such as tetrahydrofuran and dioxane; oxyethylene and oxypropylene origomers and polymers such as diethylene glycol, triethylene glycol, tetraethylene glycol, dipropylene glycol, tripropylene glycol, polyethylene glycol and polypropylene glycol; alkylene glycols having an alkylene group with 2 to 6 carbon atoms such as ethylene glycol, propylene glycol, trimethylene glycol and 1,2,6-hexanetriol; polyhydric alcohols such as glycerol, trimethylolethane and trimethylolpropane; lower alkyl ethers such as ethylene glycol monomethyl (or ethyl) ether, diethylene glycol monomethyl (or ethyl) ether and triethylene glycol monomethyl (or ethyl) ether; lower dialkyl ethers such as triethylene glycol dimethyl (or ethyl) ether and tetraethylene glycol dimethyl (or ethyl) ether; alkanolamines such as monoethanolamine, diethanolamine and triethanolamine; sulfolane; N-methyl-2-pyrrolidone; 2-pyrrolidone; and 1,3-dimethyl-2-imidazolidinone. Any of the above listed water-soluble organic solvents can be used solely or as mixture.

Additives

Ink to be used for the purpose of the present invention may be made to contain a pH regulator in order to maintain the pH value of ink to a constant level and stabilize the solubility of the dye and/or the dispersibility of the pigment in ink. Specific examples of pH regulators that can be used for the purpose of the invention include hydroxides such as lithium hydroxide, sodium hydroxide, potassium hydroxide and ammonium hydroxide; sulfates such as lithium sulfate, sodium sulfate, potassium sulfate and ammonium sulfate; carbonates such as lithium carbonate, sodium carbonate, sodium hydrogencarbonate, potassium carbonate, potassium hydrogencarbonate, potassium sodium carbonate, ammonium carbonate and ammonium hydrogencarbonate; phosphates such as lithium phosphate, sodium phosphate, disodium phosphate, trisodium phosphate, potassium phosphate, dipotassium phosphate, tripotassium phosphate, ammonium phosphate, diammonium phosphate and triammonium phosphate; and acetates such as lithium acetate, sodium acetate, potassium acetate and ammonium acetate.

While any of the above listed salts may be solely added to ink, it is more preferable to select two or more than two of those salts and add them to ink. The total rate at which such salts are added to ink is preferably between 0.1 and 10% by weight, more preferably between 1 and 8% by weight. It is difficult to maintain the pH value of ink to a constant level and fully stabilize the dissolved state of the aqueous dye in ink if the addition rate of the salts is lower than 0.1% by weight, whereas the salts can disadvantageously become deposited to clog the nozzle if the addition rate of the salts is higher than 10% by weight.

If necessary, various conventional additives such as a viscosity regulator, an antimold agent, an antiseptic agent, an antioxidant, a defoaming agent, a surfactant and/or an antidrying agent such as urea may also be used.

Ink Properties

As for the properties of ink advantageously used for ink-jet recording, the pH value of ink is preferably between 3 and 12, more preferably between 4 and 10, at and around 25° C. and the surface tension of ink is preferably between 10 and 60 mN/m (dyn/cm), more preferably between 15 and 50 mN/m (dyn/cm), while the viscosity of ink is preferably between 1 and 30 cps, more preferably between 1 and 10 cps.

Recording Method

Figure 2:
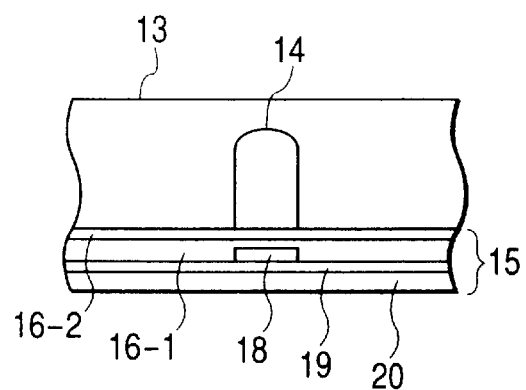
FIG. 2 is a schematic transversal cross sectional view of the recording head of the embodiment of FIG. 1.

The recording method to be used with ink for the purpose of the invention is an ink-jet recording method with which thermal energy is applied to the ink contained within the recording head to produce liquid droplets. Firstly, an ink-jet recording apparatus according to the invention that can suitably be used with such an ink-jet recording method and ink having the above described composition will be discussed by referring to FIGS. 1 through 3. FIG. 1 is a schematic longitudinal cross sectional view of a principal area of the recording head 13 of an ink-jet recording apparatus according to the invention taken along the ink path thereof and FIG. 2 is a schematic transversal cross sectional view of the recording head 13 of FIG. 1 taken along line 2—2 in FIG. 1. Referring to FIGS. 1 and 2, the recording head 13 is fabricated by bonding a plate of glass, ceramic, silicon, polysulfone or other plastic materials having an ink path (nozzle) 14 and a heat-generating element substrate 15. The heat-generating element substrate 15 comprises a protective layer 16-1 typically made of silicon oxide, silicon nitride or silicon carbide, a top surface protecting layer 16-2 made of metal such as platinum or metal oxide such as platinum oxide, preferably tantalum or tantalum oxide, a pair of electrodes 17-1 and 17-2 typically made of aluminum, gold or aluminum-copper alloy, a heat-generating resistor layer 18 made of a high melting point substance such as hafnium boride, tantalum nitride or tantalum aluminum, a heat-accumulating layer 19 typically made of silicon oxide or aluminum oxide and a substrate 20 made of a material showing a good heat-radiating efficiency such as silicon, aluminum or aluminum nitride.

Figure 3:
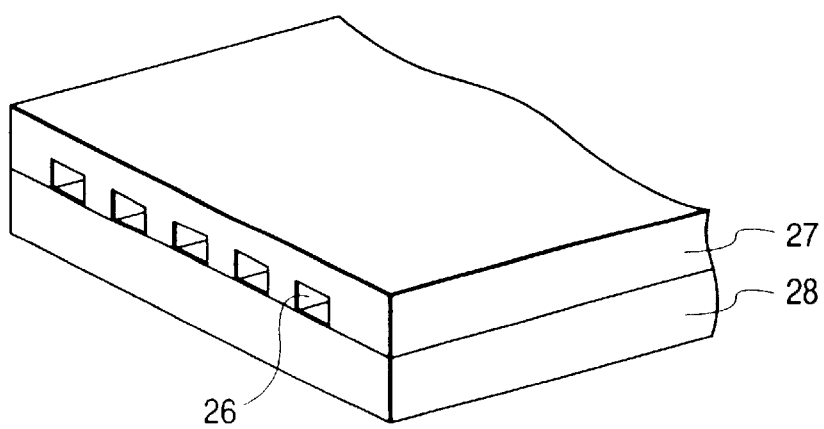
FIG. 3 is a schematic perspective view of a recording head obtained by assembling a multiple of recording heads of the type illustrated in FIG. 1.

As a pulse-shaped electric signal is applied to the electrodes 17-1 and 17-2 of the head 13, the region n (heater) of the heat-generating element substrate 15 rapidly becomes to generate heat to produce a bubble in the portion of ink 21 that is in direct contact with the surface of the region n. As a result, the meniscus 23 of ink 21 is made to project due to the pressure of such bubble and eventually, minute portions of ink 21 are discharged through the nozzle 14 and fly as ink droplets 24 from the discharge orifice 22 toward the recording medium 25 disposed oppositely relative to the head 13. FIG. 3 is a schematic perspective view of a multi-nozzle head realized by arranging a number of recording heads of the type illustrated in FIG. 1. The multi-nozzle head is fabricated by bonding a glass plate 27 having a number of grooves 26 and a heat-generating element substrate 28 as described above by referring to FIG. 1.

Amount of Energy to be Applied to the Heater

Now, the value $\gamma$ will be described. The value $\gamma$ is a factor representing the ratio of the amount of energy that is actually applied to the bubble-jet head to the minimum amount of energy for discharging ink from the head. In other words, if the pulse applied to the bubble-jet head has a width of P (or the sum of the widths when a plurality of pulses are successively applied) and the applied voltage is V while the resistance of the heater is R, the amount of the applied energy is expressed by formula (A) below.

$$E = P \times V^2 / R \tag{A}$$

If the minimum (threshold) amount of energy for discharging ink from the bubble-jet head is $E_{th}$ and the amount of energy applied in actual operation for discharging ink is $E_{op}$, the value $\gamma$ is expressed by formula (B) below.

$$\gamma = E_{op}/E_{th} \tag{B}$$

Either of the two methods as described below can typically be used to determine the value $\gamma$ on the basis of the operating conditions of the bubble-jet head.

(1) When a Fixed Pulse Width is Used:

Firstly, the bubble-jet head is driven to operate by applying a certain voltage appropriate for causing the head to discharge ink droplets, with a given pulse width. Then, the voltage is gradually lowered to find out the voltage level at which the discharge of ink droplets stops. The voltage immediately before the discharge of ink droplets stops is defined as threshold voltage $V_{th}$. If the voltage that is applied in actual operation is defined as $V_{op}$, the value $\gamma$ is determined by formula (C) below.

$$\gamma = (V_{op}/V_{th})^2 \tag{C}$$

(2) When a Fixed Voltage is Used:

Firstly, the bubble jet head is driven to operate by applying a certain voltage, with a pulse width appropriate for causing the head to discharge ink droplets. Then, the pulse width is gradually reduced to find out the pulse width at which the discharge of ink droplets stops. The pulse width immediately before the discharge of ink droplets stops is defined as threshold pulse width $P_{th}$. If the pulse width used in actual operation is defined as $P_{op}$, the value $\gamma$ is determined by formula (D) below.

$$\gamma = P_{op}/P_{th} \tag{D}$$

The voltage as used here refers to the net voltage that is actually applied to the heater itself in order to cause the BJ heater to generate heat. The voltage that is externally applied, however, can be lowered by the contact or wiring resistance of the circuit for applying the voltage to the heater. Nevertheless, when both $V_{th}$ and $V_{op}$ are observed from the outside of the head, both of the voltages will fall and fluctuate to substantially the same extent so that the value $\gamma$ determined by using the externally observed voltages will show little error unless those fluctuations are extremely large, and therefore, the above methods will not give rise to any problem even if those externally measured values are used directly.

Care should be taken, however, when a plurality of heaters are driven in a printer in an actual recording operation, because the voltage being applied to a specific one of the heaters can be influenced by the operation of the other heaters and can fluctuate.

From formulas (A) and (B) above, it may seem that the square of V is inversely proportional to P for a same value $\gamma$. In reality, however, the square of V is not accurately inversely proportional to P for various reasons including electrical problems such as that the pulse waveform is not accurately rectangular and thermal problems specific to a bubble-jet mechanism such as that the flux of heat from the heater to ink can vary as a function of the voltage applied to the heater consequently to change the bubbling conditions. Therefore, the method (1) and the method (2) described above have to be used independently. In other words, if the value obtained by either of the two methods is converted by calculation into the value to be obtained by the other method, the latter value can give rise to a significant error. In the following description, the $\gamma$ value obtained by the method (1) will be used unless specifically noted otherwise.

In order to discharge ink on a stable basis, the recording head is normally driven with a $\gamma$ value between 1.12 and 1.96. For discharging ink containing diglycollic acid from the recording head by applying thermal energy to ink, however, the $\gamma$ value is preferably held within a predetermined range between 1.10 and 1.80 in order to drive the recording head without kogation of the heater so that the recording head may enjoy a prolonged service life. While it is not clear yet why kogation of the heater can be effectively prevented from occurring and the recording head can enjoy a prolonged service life if the $\gamma$ value is found within the above range, it may be safe to presume that, so long as the $\gamma$ value is held within the above range, no excessive heat is fed to the heater to excessively raise the surface temperature of the heater so that the metal of the recording head will not become excessively corroded by diglycollic acid.

Ink-jet Recording Apparatus

Figure 4:
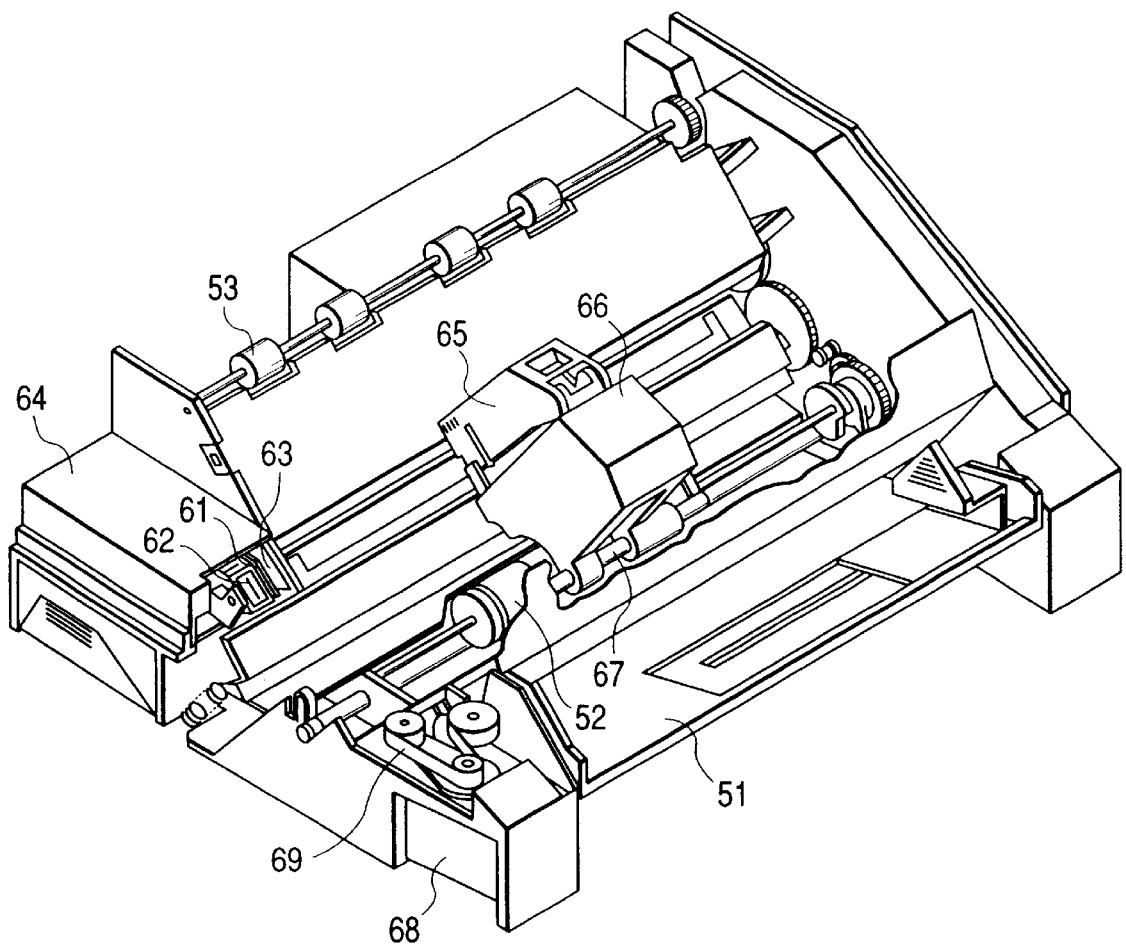
FIG. 4 is a schematic perspective view of an embodiment of ink-jet recording apparatus according to the invention.

FIG. 4 is a schematic perspective view of an embodiment of ink-jet recording apparatus according to the invention. In FIG. 4, reference numeral 61 denotes a blade operating as wiping member, which is rigidly held at an end thereof by a blade holding member so that it can operate like a cantilever. The blade 61 is arranged at a position next to the recording area of the recording head 65. In the case of this embodiment, it is partly projecting into the moving track of the recording head 65. Reference numeral 62 denotes a cap for covering the discharge orifice plane of the recording head 65. The cap 62 is arranged at a home position located next to the blade 61 and adapted to move in a direction perpendicular to the moving direction of the head 65 so that it can abut and cover the ink discharge orifice plane of the recording head 65. Reference numeral 63 denotes an ink absorbing member also arranged next to the blade 61 and, like the blade 61, held so as to partly project into the moving track of the recording head 65. The blade 61, the cap 62 and the ink absorbing member 63 form a discharge restoring section 64 and the discharge orifice is cleared of moisture and particles of dirt by the blade 61 and the ink absorbing member 63.

Referring to FIG. 4, the recording head 65 has a discharge energy generating means so that it discharges ink toward the recording medium located opposite to the ink discharge orifice plane where the discharge orifice is arranged. The recording head 65 is mounted on a carriage 66 that moves the recording head 65 along its moving track. The carriage 66 is slidably engaged with a guide shaft 67 and (although not illustrated) partly connected to a belt 69 that is driven by a motor 68. With this arrangement, the carriage 66 can move along the guide shaft 67 so that the recording head 65 move in the recording area and an adjacent area.

In FIG. 4, reference numeral 51 denotes a paper feed section adapted to receive the recording medium to be used for printing and reference numeral 52 denotes a paper feed roller that is driven by a motor (not shown). With this arrangement, the recording medium is fed to a position located vis-a-vis the discharge orifice plane of the recording head 65 and gradually moved to the paper delivery section where a paper delivery roller 53 is arranged as the recording operation proceeds on the recording medium. When the recording head 65 returns to its home position after the completion of the recording operation, the cap 62 of the discharge restoring section 64 is retracted from the moving track of the recording head 65 but the blade 61 remains projecting into the moving track so that the discharge orifice of the recording head 65 is wiped and cleared by the blade 61.

When the time comes for the cap 62 to abut and cover the discharge orifice plane of the recording head 65, it is moved and projected into the moving track of the recording head 65. When the recording head 65 is moved from the home position to the recording start position, the cap 62 and the blade 61 are held to the respective positions that are same as those where they are located for an wiping operation. Therefore, the discharge orifice plane of the recording head 65 is also wiped during this movement. Note that the movement of the recording head to the home position occurs not only when an ink recording operation is over and the recording head is made ready for another ink discharge operation but also when the recording head is moved to the recording area for the recording operation because it passes by the home position located next to the recording area with a predetermined time interval so that the discharge orifice plane may be wiped.

Figure 5:
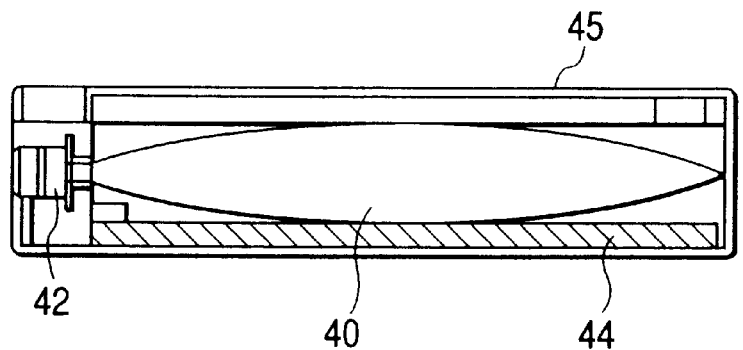
FIG. 5 is a schematic cross sectional view of an ink cartridge that can be used for the purpose of the invention, showing the inside of the ink cartridge.

FIG. 5 is a schematic cross sectional view of an ink cartridge that can be used for the purpose of the invention and contains ink to be supplied to the recording head by way of an ink supply member, which may be a tube. In FIG. 5, reference numeral 40 denotes an ink containing section, which may be an ink bag, containing ink to be supplied to the recording head and provided at the front end thereof with rubber peg 42. As a needle (not shown) or the like is forced to pierce into the peg 42, the ink contained in the ink bag 40 can be supplied to the recording head. Reference numeral 44 denotes an ink absorbing member for receiving waste ink. The inner surface of the ink containing section that is held in contact with ink is preferably formed by polyolefin such as polyethylene.

Figure 6:
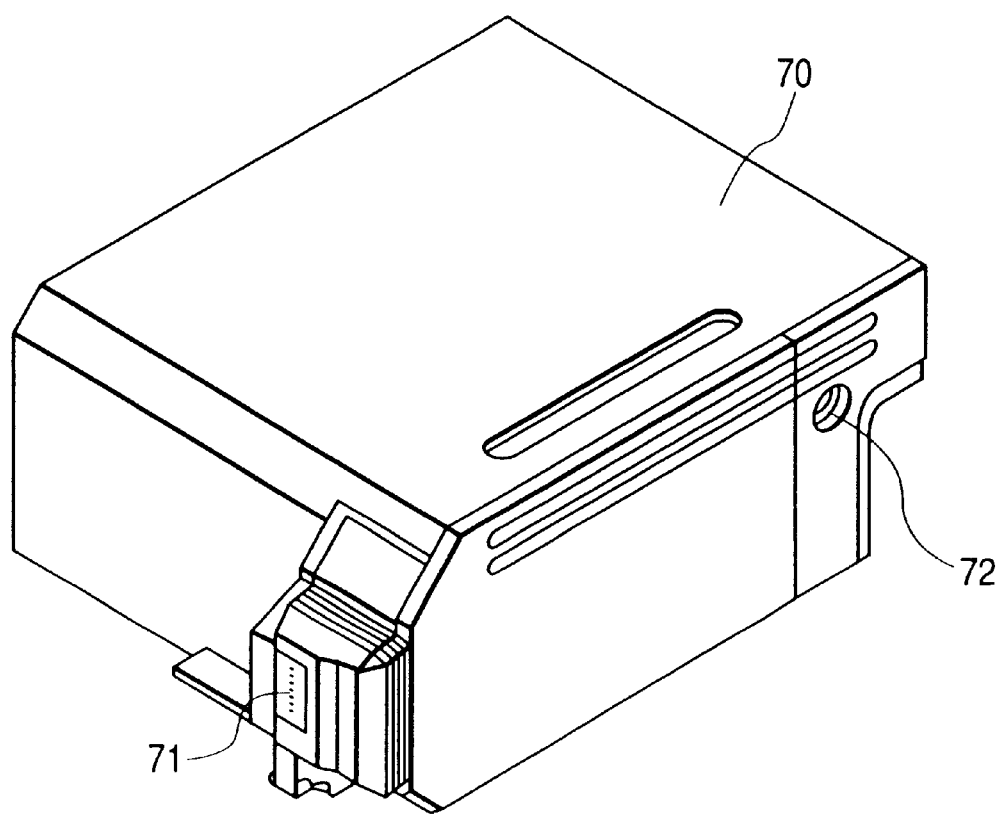
FIG. 6 is a schematic perspective view of an embodiment of recording unit according to the invention.

An ink-jet recording apparatus according to the invention does not necessarily be so designed that the recording head and the ink cartridge are arranged separately like the above described one. Alternatively, the recording head and the ink cartridge may be integrally formed as shown in FIG. 6. In FIG. 6, reference numeral 70 denotes a recording unit comprising an ink containing section containing ink therein, which may be an ink absorbing member, so that ink in the ink absorbing member is discharged as ink droplets from a head section 71 having a plurality of orifices. For the purpose of the invention, the ink absorbing member is preferably made of polyurethane. Still alternatively, the ink absorbing member may be replaced by an ink bag of an ink containing section provided in the inside with a spring. In FIG. 6, reference numeral 72 denotes an air inlet port for feeding air from the atmosphere into the inside of the cartridge. The recording unit 70 of FIG. 6 may be used in place of the recording head 65 of FIG. 4 and can be removably mounted on the carriage 66.

Second Mode of Carrying out the Invention

A characteristic feature of the second mode of carrying out the invention is the use of ink containing (a) a coloring material, (b) a liquid medium, and (c) iminodiacetic acid or iminodiacetates.

Iminodiacetic Acid and Iminodiacetates

Iminodiacetic acid and iminodiacetates that may be contained in ink to be used for the purpose of the present invention will be discussed below.

As a result of intensive efforts for finding a method of effectively reducing the kogation of the surface of the heater of an ink-jet recording head for applying thermal energy to ink in order to discharge ink as ink droplets, the inventors of the present invention came to find that the occurrence of kogation can be remarkably reduced by using ink containing iminodiacetic acid.

Furthermore, while the pH of ink to be used with an ink-jet recording method is regulated to an appropriate level, it is preferably regulated by means of basic compounds if ink contains iminodiacetic acid. Basic compounds that can be used to regulate the pH value of ink for the purpose of the invention include lithium hydroxide, sodium hydroxide, potassium hydroxide, ammonium hydroxide and organic amines (e.g., triethanolamine, diethanolamine, monoethanolamine, triisopropanolamine). Thus, the above iminodiacetic acid may be present in a salt form including, for example, lithium iminodiacetate, sodium iminodiacetate, potassium iminodiacetate and ammonium iminodiacetate. The total content of iminodiacetic acid and iminodiacetates in ink is preferably between 0.005 and 20% by weight, more preferably between 0.05 and 12% by weight, relative to the total weight of ink. As long as the total content of iminodiacetic acid and iminodiacetates is found within the above defined range, the intended effect of reducing the kogation of the surface of the heater of the recording head can reliably be enjoyed and the nozzle of the head is practically prevented from clogging.

As for the coloring material, the liquid medium and the additives to be used for the second mode of carrying out the invention, those listed above as candidates for the first mode of carrying out the invention may also provide so many candidates for the second mode of carrying out the invention. The above description of the properties of ink for the first mode of carrying out the invention also applies to the second mode of carrying out the invention. Furthermore, the recording method and the recording apparatus described above for the first mode of carrying out the invention can also be used for the second mode of carrying out the invention.

On the other hand, the amount of energy to be applied to the heater for the second mode of carrying out the invention is preferably differentiated from that of energy to be applied to the heater for the first mode of carrying out the invention. More specifically, in this mode of carrying out the invention that is adapted to use ink containing iminodiacetic acid, the kogation of the heater can be suppressed or prevented to prolong the service life of the recording head when the value γ is found within a range between 1.10 and 1.70. While it is not clear yet why kogation of the heater can be effectively prevented from occurring and the recording head can enjoy a prolonged service life if the value γ is found within the above range, it may be safe to presume that, so long as the value γ is held within the above range, no excessive heat is fed to the heater to excessively raise the surface temperature of the heater so that the metal of the recording head will not become excessively corroded by iminodiacetic acid.

Now, the present invention will be described in greater detail by way of examples and comparative examples, although the present invention is by no means limited to those examples. Note that, in the following description, the terms "portion(s)" and "%" are used in terms of weight unless specifically noted otherwise. The composition of ink in each of the examples and the comparative examples is expressed in such a way that, when added up, the contents of the ingredients make 100 portions for the ink.

First Mode of Carrying out the Invention

EXAMPLES 1 THROUGH 3 AND COMPARATIVE EXAMPLE 1

The ink of Example 1 was prepared by mixing the ingredients listed below, stirring them well until they are dissolved and causing them to pass through a microfilter with a pore size of 0.2 μm (available from Fuji Film) under pressure and the ink of Comparative Example 1 was prepared by using the same ingredients except diglycollic acid and 1.6% solution of sodium hydroxide as pH regulator.

| Ink Composition of Example 1 | |
|---|---|
| Projet Fast Black 2 (available from Zeneca) | 2 portions |
| diethylene glycol | 10 portions |
| diglycollic acid | 2 portions |
| sodium hydroxide | 1.7 portions |
| water | 84.3 portions |
| Ink Composition of Comparative Example 1 | |
| Projet Fast Black 2 (available from Zeneca) | 2 portions |
| diethylene glycol | 10 portions |
| sodium hydroxide | 0.1 portions |
| water | 87.9 portions |

Evaluation 1

The ink of Example 1 was used with an ink-jet recording apparatus comprising an on-demand type multi-nozzle recording head (BC-02: tradename, available from Canon: the top surface protecting layer of the heater thereof is made of tantalum and tantalum oxide) designed to discharge ink by applying thermal energy as a function of a recording signal and the ink was discharged under the following conditions for recording to evaluate the performance. The conditions under which the ink of Example 1 was discharged from the ink-jet recording apparatus were as follow.

pulse width:

1.1 μs (on)+3.0 μs (off)+3.2 μs (on)

drive frequency: 6,250 Hz

Then, the $V_{th}$ (minimum voltage immediately before the ink discharge stops) was observed and the ink was discharged by applying $V_{op}$ (operation voltage) that corresponds to γ=1.39. The discharge durability of the ink-jet recording head and the extent of kogation of the heater were evaluated by using the methods and the rating systems as described below after using the ink and the ink-jet recording head for ink-jet recording. Table 1 summarily shows the obtained results. Note that the above $V_{op}$ (drive voltage) was obtained by calculation, using the formula below and $V_{th}$.

$$V_{op} = \gamma \times V_{th}$$

Discharge Durability

The above described ink-jet recording apparatus was driven to discharge ink continuously under the above operating conditions and the liquid droplets discharged from the recording head were collected in a container at every $1\times10^6$ pulses and weighed by an electronic balance. The average weight of the liquid droplets discharged at every $1\times10^6$ pulses was calculated from the observed increases of the weight of the container. The discharge was continued until the ($1\times10^8$)-th pulse and the discharge durability was evaluated by using the following rating system.

A: The average weight of the discharged liquid droplets between the ($9.9\times10^7$)-th pulse and the ($1\times10^8$)-th pulse was not less than 90% of the average weight of the discharged liquid droplets between the 0th pulse and the ($1\times10^6$)-th pulse.
B: The average weight of the discharged liquid droplets between the ($9.9\times10^7$)-th pulse and the ($1\times10^8$)-th pulse was less than 90% and not less than 70% of the average weight of the discharged liquid droplets between the 0th pulse and the ($1\times10^6$)-th pulse.
C: The average weight of the discharged liquid droplets between the ($9.9\times10^7$)-th pulse and the ($1\times10^8$)-th pulse was less than 70% of the average weight of the discharged liquid droplets between the 0th pulsecharge and the ($1\times10^6$)-th pulse.
D: The discharge of liquid droplets became impossible during the operation.

Extent of Kogation

After the evaluation for discharge durability, the recording head of the ink-jet recording apparatus was broken down and the surface of the heater of the nozzle used for the discharge durability test as visually observed through an optical microscope (with a magnitude of 400). The extent of kogation was evaluated by using the following rating system.

A: Practically no kogation was observed.
B: Kogation was slightly observed.
C: Kogation was observed to a considerable extent.
D: Kogation was observed to a great extent.

In Example 2, the ink of Example 1 was discharged by applying $V_{op}$ that corresponds to γ=1.10. Similarly, in Example 3, the ink of Example 1 was discharged by applying $V_{op}$ that corresponds to γ=1.79. The ink of Comparative Example 1 that did not contain any diglycollic acid was discharged by applying $V_{op}$ that corresponds to γ=1.39, using the method of Example 1 and the discharge durability and the extent of kogation were evaluated as in Example 1. Table 1 summarily shows the obtained results.

On the other hand, for each of Examples 8 through 12, a pigment dispersion was prepared by using the corresponding ingredients listed below and subsequently the pigment ink of the example was prepared by mixing the corresponding ink ingredients including the pigment dispersion and causing them to pass through a membrane filter with a pore size of 3.0 μm (available from Sumitomo Electric Industries) under pressure.

TABLE 1

The discharge conditions and the ratings of Examples 1 through 3 and Comparative Example 1

| | diglycollic acid content (in terms of weight) | $V_{th}$ (V) | γ value $E_{op}/E_{th}$ | $V_{op}$ (V) | Discharge durability | Extent of kogation |
|---|---|---|---|---|---|---|
| Example 1 | 2 portions | 21.0 | 1.39 | 24.8 | A | A |
| Example 2 | 2 portions | 20.9 | 1.10 | 21.9 | A | A |
| Example 3 | 2 portions | 21.0 | 1.79 | 28.1 | A | A |
| Comparative Example 1 | None | 21.1 | 1.39 | 24.9 | C | C |

$V_{th}$: minimum immediately before the discharge stops (as actually observed)
$V_{op}$: drive voltage (as used in actual operation)

EXAMPLES 4 THROUGH 12

The dye ink of each of Examples 4 through 7 was prepared by mixing the corresponding ingredients listed below, stirring them well until they are dissolved and causing them to pass through a microfilter with a pore size of 0.2 μm (available from Fuji Film) under pressure.

| Ink Composition of Example 4 | |
|---|---|
| Projet Fast Yellow 2 (available from Zeneca) | 3 portions |
| diethylene glycol | 10 portions |
| diglycollic acid | 1 portions |
| sodium hydroxide | 0.8 portions |
| water | 85.2 portions |

| Ink Composition of Example 5 | |
|---|---|
| Projet Fast Magenta 2 (available from Zeneca) | 3 portions |
| diethylene glycol | 10 portions |
| diglycollic acid | 1 portions |
| sodium hydroxide | 1.6 portions |
| water | 84.4 portions |

| Ink Composition of Example 6 | |
|---|---|
| Projet Fast Cyan 2 (available from Zeneca) | 4 portions |
| diethylene glycol | 10 portions |
| diglycollic acid | 2 portions |
| sodium hydroxide | 1.6 portions |
| water | 82.4 portions |

| Ink Composition of Example 7 | |
|---|---|
| Projet Fast Black 2 (available from Zeneca) | 2 portions |
| glycerol | 5 portions |
| diethylene glycol | 5 portions |
| urea | 4 portions |
| 2-propanol | 3.5 portions |
| diglycollic acid | 5 portions |
| sodium hydroxide | 4 portions |
| ammonium sulfate | 0.1 portions |
| water | 71.4 portions |

EXAMPLE 8

Preparation of Pigment Dispersion 1

| | |
|---|---|
| styrene-acrylic acid-butyl acrylate copolymer (acid value: 116, average molecular weight: 3,700) | 5 portions |
| triethanolamine | 0.5 portions |
| diethylene glycol | 5 portions |
| water | 69.5 portions |

The above ingredients were mixed and heated in a water bath to 70° C. until the resin ingredient was completely dissolved. Then, 15 portions of carbon black "MA-100" (pH: 3.5, available from Mitsubishi Chemical Co.) and 5 portions of 2-propanol were added to the solution and pre-mixed for 30 minutes. Subsequently, the mixture was treated for dispersion under the following conditions.

dispersing device: sand grinder (manufactured by Igarashi Machinery)
grinding medium: zirconium beads having a diameter of 1 mm
filling rate of grinding medium: 50% (by volume)
grinding time: 3 hours Then, the mixture was treated for centrifugal dispersion (12,000 rpm, 20 minutes) to remove large grains and produce Pigment Dispersion 1.

Preparation of Ink of Example 8

The following ingredients were mixed in a beaker and stirred at 25° C. for 3 hours to produce the ink of Example 8.

| | |
|---|---|
| Pigment Dispersion 1 | 30 portions |
| diethylene glycol | 10 portions |
| 2-propanol | 2 portions |
| diglycollic acid | 1 portion |

| | |
|---|---|
| sodium hydroxide | 0.8 portions |
| water | 56.2 portions |

EXAMPLE 9

Preparation of Pigment Dispersion 2

300 g of commercially available acidic carbon black "MA77" (pH3, available from Mitsubishi Chemical Co.) and 1,000 ml of water were mixed well and 450 g of sodium hydrochlorite (effective chlorine concentration: 12%) was added to the mixture drop by drop and the mixture was stirred at 100 to 105° C. for 10 hours. The obtained slurry was made to pass through Toyo Filter Paper No. 2 (tradename, available from Advantis) and the obtained pigment particles were thoroughly washed with water. The pigment wet cake was re-dispersed into 3,000 ml of water and desalted by means of reverse osmotic film until the electric conductivity was reduced to 0.2 $\mu$S. Then, the dispersion of the pigment (pH=8 to 10) was condensed until it showed a pigment concentration of 10 wt % to produce Pigment Dispersion 2. As a result of the above process, —COONa groups were introduced onto the surface of the carbon black particles to make them show a self-dispersing effect.

Preparation of Ink of Example 9

The following ingredients were mixed in a beaker and stirred at 25° C. for 3 hours. Then, the mixture was made to pass through a membrane filter with a pore size of 3.0 $\mu$m (available from Sumitomo Electric Industries) under pressure to produce the ink of Example 9.

| | |
|---|---|
| Pigment Dispersion 2 | 30 portions |
| glycerol | 5 portions |
| trimethyrolpropane | 5 portions |
| acetylene glycol ethylene oxide adduct (Acetylenol EH: tradename, available from Kawaken Fine Chemical) | 0.2 portions |
| diglycollic acid | 1 portion |
| sodium hydroxide | 0.8 portions |
| water | 58 portions |

EXAMPLE 10

Preparation of Pigment Dispersion 3

| | |
|---|---|
| styrene-acrylic acid copolymer (acid value: 200, average molecular weight: 7,000) | 5.5 portions |
| monoethanolamine | 1.0 portions |
| deionized water | 67.5 portions |
| diethylene glycol | 5 portions |

The above ingredients were mixed and heated in a water bath to 70° C. until the resin ingredient was completely dissolved. Then, 20 portions of C. I. Pigment Yellow 93 and 1.0 portion of isopropyl alcohol were added to the solution and pre-mixed for 30 minutes. Subsequently, the mixture was treated for dispersion under the following conditions.
dispersing device: sand grinder
grinding medium: glass beads having a diameter of 1 mm
filling rate of grinding medium: 50% (by volume)
grinding time: 3 hours
Then, the mixture was treated for centrifugal dispersion (12,000 rpm, 20 minutes) to remove large grains and produce Pigment Dispersion 3.

Preparation of Ink of Example 10

The following ingredients were mixed in a beaker and stirred at 25° C. for 3 hours to produce the ink of Example 10.

| | |
|---|---|
| Pigment Dispersion 3 | 20 portions |
| glycerol | 15 portions |
| diethylene glycol | 10 portions |
| Acetylenol EH (tradename, available from Kawaken Fine Chemical) | 0.3 portions |
| diglycollic acid | 1 portion |
| sodium hydroxide | 0.8 portions |
| water | 52.9 portions |

EXAMPLE 11

Preparation of Pigment Dispersion 4

| | |
|---|---|
| styrene-acrylic acid copolymer (acid value: 200, average molecular weight: 7,000) | 5.5 portions |
| monoethanolamine | 1.0 portions |
| deionized water | 67.5 portions |
| diethylene glycol | 5 portions |

The above ingredients were mixed and heated in a water bath to 70° C. until the resin ingredient was completely dissolved. Then, 20 portions of C. I. Pigment Red 122 and 1.0 portion of isopropyl alcohol were added to the solution and pre-mixed for 30 minutes. Subsequently, the mixture was treated for dispersion under the following conditions.
dispersing device: sand grinder
grinding medium: glass beads having a diameter of 1 mm
filling rate of grinding medium: 50% (by volume)
grinding time: 3 hours
Then, the mixture was treated for centrifugal dispersion (12,000 rpm, 20 minutes) to remove large grains and produce Pigment Dispersion 3.

Preparation of Ink of Example 11

The following ingredients were mixed in a beaker and stirred at 25° C. for 3 hours to produce the ink of Example 11.

| | |
|---|---|
| Pigment Dispersion 4 | 20 portions |
| glycerol | 15 portions |
| diethylene glycol | 10 portions |
| Acetylenol EH (tradename, available from Kawaken Fine Chemical) | 0.3 portions |
| diglycollic acid | 1 portion |
| sodium hydroxide | 0.8 portions |
| water | 52.9 portions |

EXAMPLE 12

Preparation of Pigment Dispersion 5

| | |
|---|---|
| styrene-acrylic acid copolymer (acid value: 200, average molecular weight: 7,000) | 5.5 portions |
| monoethanolamine | 1.0 portions |
| deionized water | 67.5 portions |
| diethylene glycol | 5 portions |

The above ingredients were mixed and heated in a water bath to 70° C. until the resin ingredient was completely dissolved. Then, 20 portions of C. I. Pigment Blue 15:3 and 1.0 portion of isopropyl alcohol were added to the solution and pre-mixed for 30 minutes. Subsequently, the mixture was treated for dispersion under the following conditions.
dispersing device: sand grinder
grinding medium: glass beads having a diameter of 1 mm
filling rate of grinding medium: 50% (by volume)
grinding time: 3 hours
Then, the mixture was treated for centrifugal dispersion (12,000 rpm, 20 minutes) to remove large grains and produce Pigment Dispersion 3.

Preparation of Ink of Example 12

The following ingredients were mixed in a beaker and stirred at 25° C. for 3 hours to produce the ink of Example 12.

| | |
|---|---|
| Pigment Dispersion 5 | 20 portions |
| glycerol | 15 portions |
| diethylene glycol | 10 portions |
| Acetylenol EH (tradename, available from Kawaken Fine Chemical) | 0.3 portions |
| diglycollic acid | 1 portion |
| sodium hydroxide | 0.8 portions |
| water | 52.9 portions |

COMPARATIVE EXAMPLES 2 THROUGH 10

The ink of each of Comparative Examples 2 through 5 was prepared by mixing the corresponding ingredients listed below, stirring them well until they are dissolved and causing them to pass through a microfilter with a pore size of 0.2 μm (available from Fuji Film) under pressure. The pigment inks of Comparative Examples 6 through 10 were prepared by mixing the respective combinations of ingredients listed below along with respective Pigment Dispersions 1 through 5 prepared in Examples 8 through 12 and causing the mixtures to pass through a membrane filter with a pore size of 3.0 μm (available from Sumitomo Electric Industries) under pressure.

| Ink Composition of Comparative Example 2 | |
|---|---|
| Projet Fast Yellow 2 (available from Zeneca) | 3 portions |
| diethylene glycol | 10 portions |
| water | 87 portions |

| Ink Composition of Comparative Example 3 | |
|---|---|
| Projet Fast Magenta 2 (available from Zeneca) | 3 portions |
| diethylene glycol | 10 portions |
| water | 87 portions |

| Ink Composition of Comparative Example 4 | |
|---|---|
| Projet Fast Cyan 2 (available from Zeneca) | 4 portions |
| diethylene glycol | 10 portions |
| water | 87 portions |

| Ink Composition of Comparative Example 5 | |
|---|---|
| Projet Fast Black 2 (available from Zeneca) | 3 portions |
| glycerol | 5 portions |
| diethylene glycol | 5 portions |
| urea | 5 portions |
| sodium hydroxide | 0.1 portions |
| ammonium sulfate | 0.1 portions |
| water | 82.8 portions |

Ink Composition of Comparative Example 6

The following ingredients were mixed in a beaker and stirred at 25° C. for 3 hours to produce the ink of Comparative Example 6.

| | |
|---|---|
| Pigment Dispersion 1 | 30 portions |
| diethylene glycol | 10 portions |
| 2-propanol | 2 portions |
| water | 58 portions |

Ink Composition of Comparative Example 7

The following ingredients were mixed in a beaker and stirred at 25° C. for 3 hours. Then, the mixture was made to pass through a membrane filter with a pore size of 3.0 μm (available from Sumitomo Electric Industries) under pressure to produce the ink of Comparative Example 7.

| | |
|---|---|
| Pigment Dispersion 2 | 30 portions |
| glycerol | 5 portions |
| trimethyrolpropane | 5 portions |
| acetylene glycol ethylene oxide adduct (Acetylenol EH: tradename, available from Kawaken Fine Chemical) | 0.2 portions |
| water | 59.8 portions |

Ink Composition of Comparative Example 8

The following ingredients were mixed in a beaker and stirred at 25° C. for 3 hours to produce the ink of Comparative Example 8.

| | |
|---|---|
| Pigment Dispersion 3 | 20 portions |
| diethylene glycol | 10 portions |
| glycerol | 15 portions |
| Acetylenol EH (tradename, available from Kawaken Fine Chemical) | 0.3 portions |
| water | 54.7 portions |

Ink Composition of Comparative Example 9

The following ingredients were mixed in a beaker and stirred at 25° C. for 3 hours to produce the ink of Comparative Example 9.

| | |
|---|---|
| Pigment Dispersion 4 | 20 portions |
| glycerol | 15 portions |
| diethylene glycol | 10 portions |
| Acetylenol EH (tradename, available from Kawaken Fine Chemical) | 0.3 portions |
| water | 54.7 portions |

Ink Composition of Comparative Example 10

The following ingredients were mixed in a beaker and stirred at 25° C. for 3 hours to produce the ink of Comparative Example 10.

| | |
|---|---|
| Pigment Dispersion 5 | 20 portions |
| glycerol | 15 portions |
| diethylene glycol | 10 portions |
| Acetylenol EH (tradename, available from Kawaken Fine Chemical) | 0.3 portions |
| water | 54.7 portions |

Evaluation 2

Each of the inks of Examples 4 through 12 and Comparative Example2 2 through 10 was used with a number of ink-jet recording apparatus comprising an on-demand type multi-recording-head (BC-02: tradename, available from Canon: the top surface protecting layer of the heater thereof is made of tantalum and tantalum oxide) designed to discharge ink by applying thermal energy as a function of a recording signal and the ink was discharged under the following conditions for recording. The conditions under which each of the inks was discharged from the ink-jet recording apparatus were as follow; pulse width: 1.1 $\mu$s (on)+3.0 $\mu$s (off)+3.2 $\mu$s (on), drive frequency: 6,250 Hz. Then, the $V_{th}$ (critical voltage immediately before the ink discharge stops) was observed and the ink was discharged by applying Vop (drive voltage) that corresponds to γ value= 1.39. The discharge durability of the ink-jet recording head and the extent of kogation of the heater were evaluated by using the methods and the rating systems as described below after using the ink and the ink-jet recording head for ink-jet recording. Table 2-1 and Table 2—2 summarily shows the obtained results.

Discharge Durability

The above described ink-jet recording apparatus was driven to discharge ink continuously under the above operating conditions and the liquid droplets discharged from the recording head were collected in a container at every $1 \times 10^6$ pulses and weighed by an electronic balance. The average weight of the liquid droplets discharged at every $1 \times 10^6$ pulses was calculated from the observed increases of the weight of the container. The discharge was continued until the $(1 \times 10^8)$-th pulse and the discharge durability was evaluated by using the following rating system.

A: The average weight of the discharged liquid droplets between the $(9.9 \times 10^7)$-th pulse and the $(1 \times 10^8)$-th pulse was not less than 90% of the average weight of the discharged liquid droplets between the 0th pulse and the $(1 \times 10^6)$-th pulse.
B: The average weight of the discharged liquid droplets between the $(9.9 \times 10^7)$-th pulse and the $(1 \times 10^8)$-th pulse was less than 90% and not less than 70% of the average weight of the discharged liquid droplets between the 0th pulse and the $(1 \times 10^6)$-th pulse.
C: The average weight of the discharged liquid droplets between the $(9.9 \times 10^7)$-th pulse and the $1 \times 10^8$-th pulse was less than 70% of the average weight of the discharged liquid droplets between the 0th pulse and the $(1 \times 10^6)$-th pulse.
D: The discharge of liquid droplets became impossible during the operation.

Extent of Kogation

After the evaluation for discharge durability, the recording head of each of the ink-jet recording apparatus was broken down and the surface of the heater of the nozzle used for the discharge durability test as visually observed through an optical microscope (with a magnitude of 400). The extent of kogation was evaluated by using the following rating system.

A: Practically no kogation was observed.
B: Kogation was slightly observed.
C: Kogation was observed to a considerable extent.
D: Kogation was observed to a great extent.

TABLE 2-1

The discharge conditions and the ratings of Examples 4 through 12

| Example | diglycollic acid content (in terms of weight) | Type and content (in terms of weight) of coloring material | $V_{th}$ (V) | γ value $E_{op}/E_{th}$ | $V_{op}$ (V) | Discharge durability | Extent of kogation |
|---|---|---|---|---|---|---|---|
| 4 | 1 portion | Projet fast yellow 2; 3 portions | 21.1 | 1.39 | 24.9 | A | A |
| 5 | 1 portion | Projet fast magenta 2; 3 portions | 21.0 | 1.39 | 24.8 | A | A |
| 6 | 2 portions | Projet fast cyan 2; 4 portions | 20.9 | 1.39 | 24.6 | A | A |
| 7 | 5 portions | Projet fast black 2; 2 portions | 20.9 | 1.39 | 24.6 | A | A |
| 8 | 1 portion | Carbon black 4.5 portions | 21.1 | 1.39 | 24.9 | A | A |
| 9 | 1 portion | Carbon black (with introduced COONa group); 3 portions | 21.0 | 1.39 | 24.8 | A | A |
| 10 | 1 portion | C.I. Pigment yellow 93; 4 portions | 21.0 | 1.39 | 24.8 | A | A |

TABLE 2-1-continued

The discharge conditions and the ratings of Examples 4 through 12

| Example | diglycollic acid content (in terms of weight) | Type and content (in terms of weight) of coloring material | $V_{th}$ (V) | γ value $E_{op}/E_{th}$ | $V_{op}$ (V) | Discharge durability | Extent of kogation |
|---|---|---|---|---|---|---|---|
| 11 | 1 portion | C.I. Pigment red 122; 4 portions | 21.1 | 1.39 | 24.9 | A | A |
| 12 | 1 portion | C.I. Pigment blue 15:3; 4 portions | 20.9 | 1.39 | 24.6 | A | A |

$V_{th}$: minimum voltage immediately before the discharge stops (as acutally observed)
$V_{op}$: drive voltage (as used in actual operation)

TABLE 2-2

The discharge conditions and the ratings of Comparative Examples 2 through 10

| Comparative Example | Type and content (in terms of weight) of coloring material | $V_{th}$ (V) | γ Value $E_{op}/E_{th}$ | $V_{op}$ (V) | Discharge durability | Extent of kogation |
|---|---|---|---|---|---|---|
| 2 | Projet fast yellow 2; 3 portions | 21.0 | 1.39 | 24.8 | B | B |
| 3 | Projet fast magenta 2; 3 portions | 21.1 | 1.39 | 24.9 | C | C |
| 4 | Projet fast cyan 2; 4 portions | 20.8 | 1.39 | 24.5 | B | B |
| 5 | Projet fast black 2; 2 portions | 20.9 | 1.39 | 24.6 | B | B |
| 6 | Carbon black; 4.5 portions | 21.0 | 1.39 | 24.8 | B | B |
| 7 | Carbon black (with introduced COONa groups); 3 portions | 21.1 | 1.39 | 24.9 | B | B |
| 8 | C.I. pigment yellow 93; 4 portions | 21.3 | 1.39 | 25.1 | B | B |
| 9 | C.I. pigment red 122; 4 portions | 21.1 | 1.39 | 24.9 | C | C |
| 10 | C.I. pigment blue 15:3; 4 portions | 20.8 | 1.39 | 24.5 | C | C |

Second Mode of Carrying out the Invention

EXAMPLES 13 THROUGH 15, REFERENCE EXAMPLES 1 AND 2, AND COMPARATIVE EXAMPLE 11

The ink of Example 13 was prepared by mixing the ingredients listed below, stirring them well until they are dissolved and causing them to pass through a microfilter with a pore size of 0.2 μm (available from Fuji Film) under pressure and the ink of Comparative Example 11 was prepared by using the same ingredients except iminodiacetic acid and 0.6% sodium hydroxide, which operated as pH regulator.

| Ink Composition of Example 13 | |
|---|---|
| Projet Fast Black 2 (available from Zeneca) | 2 portions |
| diethylene glycol | 10 portions |
| iminodiacetic acid | 2 portions |
| sodium hydroxide | 0.7 portions |
| water | 85.3 portions |
| Ink Composition of Comparative Example 11 | |
| Projet Fast Black 2 (available from Zeneca) | 2 portions |
| diethylene glycol | 10 portions |
| sodium hydroxide | 0.1 portions |
| water | 87.9 portions |

Evaluation 3

The discharge durability of the ink-jet recording head and the extent of kogation were evaluated for the ink of Example 13 in a manner as described above for Examples 1 through 3 and Comparative Example 1 under Evaluation 1

Then, in Example 14, the ink of Example 13 was discharged by applying Vop (drive voltage) that corresponds to γ value=1.10. Similarly, in Example 15, the ink of Example 13 was discharged by applying Vop (drive voltage) that corresponds to γ value=1.80. In Reference Example 1, the ink of Example 13 was discharged by applying Vop (drive voltage) that corresponds to γ value=1.80. Similarly, in Reference Example 2, the ink of Example 13 was discharged by applying Vop (drive voltage) that corresponds to γ value=1.96. The ink of Comparative Example 11 that did not contain any iminodiacetic acid was discharged by applying Vop (drive voltage) that corresponds to γ value=1.39, using the method of Example 13 and the discharge durability and the extent of kogation were evaluated as in Example 13. Table 3 summarily shows the obtained results.

TABLE 3

The discharge conditions and the ratings of Examples 13 through 15, Reference Examples 1 and 2 and Comparative Example 11

| | iminodiacetic acid content (in terms of weight) | $V_{th}$ (V) | γ value $E_{op}/E_{th}$ | $V_{op}$ (V) | Discharge durability | Extent of kogation |
|---|---|---|---|---|---|---|
| Example 13 | 2 portions | 21.0 | 1.39 | 24.8 | A | A |
| Example 14 | 2 portions | 20.9 | 1.10 | 21.9 | A | A |
| Example 15 | 2 portions | 20.9 | 1.69 | 27.2 | A | A |
| Reference Example 1 | 2 portions | 20.8 | 1.80 | 27.9 | D | B |
| Reference Example 2 | 2 portions | 21.0 | 1.96 | 29.4 | D | C |
| Comparative Example 11 | None | 21.0 | 1.39 | 24.8 | C | C |

$V_{th}$: minimum voltage immediately before the discharge stops (as actually observed)
$V_{op}$: drive voltage (as used in actual operation)

EXAMPLES 16 THROUGH 24

The dye ink of each of Examples 16 through 19 was prepared by mixing the corresponding ingredients listed below, stirring them well until they are dissolved and causing them to pass through a microfilter with a pore size of 0.2 μm (available from Fuji Film) under pressure. For each Examples 20 through 24, a dispersed pigment solution was prepared by using the corresponding ingredients listed below and subsequently the pigment ink of the example was prepared by mixing the corresponding ink ingredients and causing them to pass through a membrane filter with a pore size of 3.0 μm (available from Sumitomo Electric Industries) under pressure.

Ink Composition of Example 16

| Projet Fast Yellow 2 (available from Zeneca) | 3 portions |
|---|---|
| diethylene glycol | 10 portions |
| iminodiacetic acid | 0.5 portions |
| sodium hydroxide | 0.15 portions |
| water | 86.35 portions |

Ink Composition of Example 17

| Projet Fast Magenta 2 (available from Zeneca) | 3 portions |
|---|---|
| diethylene glycol | 10 portions |
| iminodiacetic acid | 2 portions |
| sodium hydroxide | 0.6 portions |
| water | 84.4 portions |

Ink Composition of Example 18

| Projet Fast Cyan 2 (available from Zeneca) | 4 portions |
|---|---|
| diethylene glycol | 10 portions |
| iminodiacetic acid | 1 portion |
| sodium hydroxide | 0.3 portions |
| water | 84.7 portions |

Ink Composition of Example 19

| Projet Fast Black 2 (available from Zeneca) | 2 portions |
|---|---|
| glycerol | 5 portions |
| diethylene glycol | 5 portions |
| urea | 4 portions |
| 2-propanol | 3.5 portions |
| iminodiacetic acid | 5 portions |
| sodium hydroxide | 1.6 portions |
| ammonium sulfate | 0.1 portions |
| water | 73.8 portions |

Ink Composition of Example 20

The following ingredients were mixed in a beaker and stirred at 25° C. for 3 hours to produce the ink of Example 20.

| Pigment Dispersion 1 of Example 8 | 30 portions |
|---|---|
| diethylene glycol | 10 portions |
| 2-propanol | 2 portions |
| iminodiacetic acid | 1 portion |
| sodium hydroxide | 0.3 portions |
| water | 56.7 portions |

Ink Composition of Example 21

The following ingredients were mixed in a beaker and stirred at 25° C. for 3 hours. Then, the mixture was made to pass through a membrane filter with a pore size of 3.0 μm (available from Sumitomo Electric Industries) under pressure to produce the ink of Example 21.

| Pigment Dispersion 2 of Example 9 | 30 portions |
|---|---|
| glycerol | 5 portions |
| trimethyrolpropane | 5 portions |
| acetylene glycol ethylene oxide adduct (Acetynol EH: tradename, available from Kawaken Fine Chemical) | 0.2 portions |
| iminodiacetic acid | 1 portion |
| sodium hydroxide | 0.3 portions |
| water | 58.5 portions |

Ink Composition of Example 22

The following ingredients were mixed in a beaker and stirred at 25° C. for 3 hours to produce the ink of Example 22.

| Pigment Dispersion 3 of Example 10 | 20 portions |
|---|---|
| glycerol | 15 portions |
| diethylene glycol | 10 portions |
| Acetylenol EH (tradename, available from Kawaken Fine Chemical) | 0.3 portions |
| iminodiacetic acid | 1 portion |
| sodium hydroxide | 0.3 portions |
| water | 53.4 portions |

Ink Composition of Example 23

The following ingredients were mixed in a beaker and stirred at 25° C. for 3 hours to produce the ink of Example 23.

| | |
|---|---|
| Pigment Dispersion 4 of Example 11 | 20 portions |
| glycerol | 15 portions |
| diethylene glycol | 10 portions |
| Acetylenol EH (tradename, available from Kawaken Fine Chemical) | 0.3 portions |
| iminodiacetic acid | 1 portion |
| sodium hydroxide | 0.3 portions |
| water | 53.4 portions |

Ink Composition of Example 24

The following ingredients were mixed in a beaker and stirred at 25° C. for 3 hours to produce the ink of Example 24.

| | |
|---|---|
| Pigment Dispersion 5 of Example 12 | 20 portions |
| glycerol | 15 portions |
| diethylene glycol | 10 portions |
| Acetylenol EH (tradename, available from Kawaken Fine Chemical) | 0.3 portions |
| iminodiacetic acid | 1 portion |
| sodium hydroxide | 0.3 portions |
| water | 53.4 portions |

Evaluation 4

The discharge durability of the ink-jet recording head and the extent of kogation were evaluated for the inks of Examples 16 through 24 in a manner as described above under <Evaluation 2>. Table 4 below summarily shows the obtained results.

As described above in detail, according to the invention, with an ink-jet recording method utilizing thermal energy, the kogation of the surface of the heater of a recording head can be effectively reduced and the service life of the recording head can be remarkably prolonged. Furthermore, according to the invention, there are provided a method of reducing the kogation of the surface of the heater of a recording head, an ink-jet recording method, an ink-jet recording apparatus, a recording unit and a method for prolonging the service life of a recording head.

What is claimed is:

1. A set of inks for thermal ink-jet recording, said inks having different colors from each other, and each of said inks comprising
    (a) a coloring material,
    (b) water,
    (c) diglycolic acid, and
    (d) a cation selected from the group consisting of lithium ion, sodium ion, potassium ion, ammonium ion and amine ion.

2. A set of inks according to claim 1, wherein the total content of said component (c) is between 0.005% and 20% by weight relative to the total weight of said inks.

3. A set of inks according to claim 1, wherein said coloring material is a water-soluble dye.

4. A set of inks according to claim 1, wherein said coloring material is a pigment.

5. A set of inks according to claim 1, wherein the content of said water is between 35% and 96% by weight relative to the total weight of said inks.

6. A method of reducing the kogation of a surface of a heater of an ink-jet recording head of an inkjet printer, the heater being adapted for applying thermal energy to ink in order to discharge the ink from an orifice and having a top surface protecting layer containing a metal and/or a metal oxide, said method comprising applying energy in the amount of $E_{op}$ to the heater for generating the thermal energy, wherein the ink comprises

TABLE 4

The discharge conditions and the ratings of Examples 16 through 24

| Example | iminodiacetic acid content (in terms of weight) | Type and content (in terms of weight) of coloring material | $V_{th}$ (V) | γ Value $E_{op}/E_{th}$ | $V_{op}$ (V) | Discharge durability | Extent of kogation |
|---|---|---|---|---|---|---|---|
| 16 | 0.5 portions | Projet fast yellow 2; 3 portions | 21.0 | 1.39 | 24.8 | A | A |
| 17 | 2 portions | Projet fast magenta 2; 3 portions | 20.8 | 1.39 | 24.5 | A | A |
| 18 | 1 portion | Projet fast cyan 2; 4 portions | 20.9 | 1.39 | 24.6 | A | A |
| 19 | 5 portions | Projet fast black 2; 2 portions | 21.0 | 1.39 | 24.8 | A | A |
| 20 | 1 portion | Carbon black; 4.5 portions | 21.1 | 1.39 | 24.9 | A | A |
| 21 | 1 portion | Carbon black (with introduced COONa group); 3 portions | 21.1 | 1.39 | 24.9 | A | A |
| 22 | 1 portion | C.I. Pigment yellow 93; 4 portions | 20.9 | 1.39 | 24.6 | A | A |
| 23 | 1 portion | C.I. Pigment red 122; 4 portions | 21.0 | 1.39 | 24.8 | A | A |
| 24 | 1 portion | C.I. Pigment blue 15:3; 4 portions | 21.0 | 1.39 | 24.8 | A | A |

$V_{th}$: minimum voltage immediately before the discharge stops (as actually observed)
$V_{op}$: drive voltage (as used in actual operation)

(a) a coloring material,
(b) water,
(c) diglycolic acid, and
(d) a cation selected from the group consisting of lithium ion, sodium ion, potassium ion, ammonium ion and amine ion, and wherein, if the minimal amount of energy to be applied to the heater in order to make the recording head discharge the ink therefrom is $E_{th}$, the ratio of $E_{OP}/E_{th}$ satisfies the relationship:

$$1.10 \leq E_{op}/E_{th} \leq 1.80.$$

7. A method according to claim 6, wherein the metal and/or the metal oxide are tantalum and/or tantalum oxide.

8. An ink-jet recording method comprising a step of discharging ink from an ink-jet recording head provided with a heater by applying energy in the amount of $E_{op}$ to the heater, the heater having a top surface protecting layer containing a metal and/or a metal oxide, wherein the ink comprises
(a) a coloring material,
(b) water,
(c) diglycolic acid, and
(d) a cation selected from the group consisting of lithium ion, sodium ion, potassium ion, ammonium ion and amine ion, and wherein, if the minimal amount of energy to be applied to the heater in order to make the recording head discharge the ink therefrom is $E_{th}$, the ratio of $E_{op}/E_{th}$ satisfies the relationship:

$$1.10 \leq E_{op}/E_{th} \leq 1.80.$$

9. A set of inks for thermal ink-jet recording, said inks having different colors from each other and alleviating kogation on a heater of a thermal ink-jet head, and each of said inks comprising
(a) a coloring material,
(b) water, and
(c) diglycolic acid,
   wherein the pH of each of said inks is regulated with a basic compound selected from the group consisting of lithium hydroxide, potassium hydroxide, ammonium hydroxide and an organic amine.

10. A set of inks according to claim 9, wherein said organic amine is selected from the group consisting of triethanolamine, diethanolamine, monoethanolamine, and triisopropanolamine.

* * * * *